Figure 1:
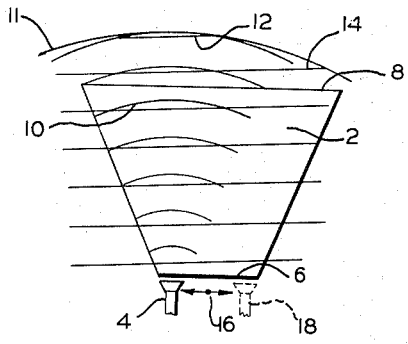

Aug. 28, 1956  C. V. ROBINSON  2,761,136
FULL REVERSE ROLL THROAT SCAN HORN
Filed Nov. 28, 1945  3 Sheets-Sheet 1

INVENTOR
CHARLES V. ROBINSON
BY *M. O. Hayes*
ATTORNEY.

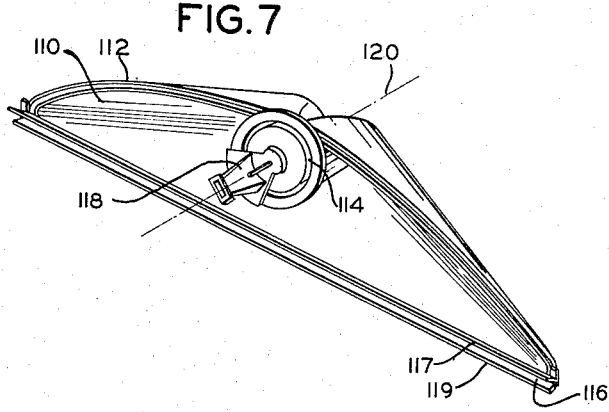
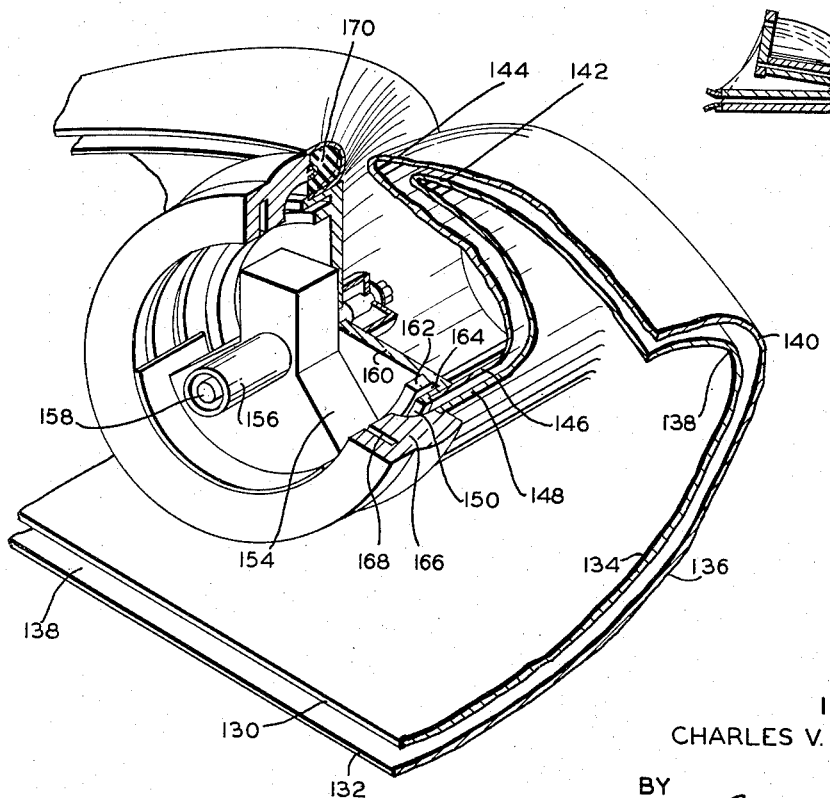

Aug. 28, 1956 C. V. ROBINSON 2,761,136
FULL REVERSE ROLL THROAT SCAN HORN
Filed Nov. 28, 1945 3 Sheets-Sheet 3

INVENTOR
CHARLES V. ROBINSON
BY
*M. O. Hayes*
ATTORNEY

United States Patent Office 2,761,136
Patented Aug. 28, 1956

2,761,136

FULL REVERSE ROLL THROAT SCAN HORN

Charles V. Robinson, Newton Center, Mass., assignor, by mesne assignments, to the United States of America as represented by the Secretary of the Navy Application November 28, 1945, Serial No. 631,449

19 Claims. (Cl. 343—762)

This invention relates generally to directional microwave rapid scanning antennas, and in particular to a parallel plate, flared and rolled throat feed horn illuminating a reflector, for producing a tilting or scanning radiation beam in response to a revolvable wave guide feed travelling around the annular throat opening of the feed horn.

A reflector scanning feed horn may be formed of two parallel flat plates of trapezoidal shape, where microwave energy is fed from the open end of a wave guide into the aperture between the plates at the smaller or throat end, and the larger of mouth end is used as the output for illuminating a reflector. As the feed guide is moved laterally across the throat the phases of points at the mouth will be correspondingly varied. Inside such a parallel plate horn the wave front will be substantially circular resulting from the wave guide end source, and its mode will be the free space or TEM mode. At the mouth of the horn there will be a line source of such phase that the wave front emerging has the shape of a surface generated by revolving a circular arc about its intercepting chord i. e. in particular the circular wave front at the line aperture revolved about the aperture as an axis. To utilize this illumination a reflector is needed to transform it into a plane wave front or directional beam, which will in turn vary its direction as the wave guide feed reciprocates in the throat opening.

To simplify the introduction of energy into the throat of such a horn at different points in order to produce a phase shift at the mouth, or in other words to produce a tilt in the output from the horn, the throat of the parallel plate tapered horn may be rolled into two concentric circular arcs so that an annular opening is provided at the throat. With this rolled throat a rotary motion of the wave guide feed may be used instead of a linear reciprocating motion at the throat, for producing the scan. Such a rolled throat is described in patent application of Roy Clarence Spencer Serial No. 628,283, filed November 13, 1945, now Patent No. 2,721,263, issued October 18, 1955.

The rolled throat idea is in the present invention, however, carried to a more complete application and embodiment by rolling the throat into a complete circle, by making a full reverse bend in the horn which also provides compactness. As the rotary feed guide travels around the rolled throat the output of the horn tilts in direction, scanning however always in one direction and then repeating its course, rather than oscillating back and forth. With the flat throat or the semi-circular rolled throat the wave guide feed must be reciprocatory or else employ a rotary feed with several arms and an R. F. switch whereas with the present fully rolled throat a single revolving feed guide may be employed without any switch.

Since the wave guide feed covers an appreciable portion of the arc, as it revolves there will be a region near the scan cross-over point where radiation introduced into the throat on one side of the cross-over will leak across to the other side of the scan cross-over point of the throat. Consequently there will be, when the feed is in this region of its orbit, radiation travelling in both of the extreme tilt directions and there will be produced thereby an ambiguity of response. To minimize this, a microwave energy absorbing septum of "polyiron" or other suitable material is inserted at this point in the feed path at the throat to fence off undesired energy leakage across the scan cross-over point. Polyiron is the commonly used name derived from its designation by a manufacturer, of finely powdered iron particles that have been rolled and encased in some resinous material so that each particle is coated with an insulating medium, the particles then being formed into a homogeneous mass. This mass is then broken up into small particles and used either in loose form or as in this application pressed into a solid shape. Other material such as Carborundum may be used for the absorbent septum.

The wave front of the output radiation from the line aperture of the horn, as has been referred to above, will be an arcuate surface or figure of revolution, such as developed by revolving a portion of a circular arc about its intercepting chord. To utilize this illumination in the form of a beam with a plane wave front, a reflector or "dish," so called, is needed to transform the arcuate front to a plane front.

The objects of this invention, therefore, are as follows: to construct a rapid scan antenna adapted to be fed by a revolving wave guide feed for producing a scanning or tilting plane wave front radiation beam; to construct a fully rolled throat parallel plate feed horn adapted to be fed by a revolving wave guide feed; to construct such a horn as a developable surface from flat metal sheets by rolling and bending only; to obtain compactness in said rolled throat horn by employing a full reverse bend in the parallel plates of the feed horn between the completely circular throat and the line source outlet end; to minimize ambiguity at the crossover point of the feed travel by inserting an absorbent septum to partly isolate the region on each side of the scan crossover point from energy introduced into the throat on the other side; and to construct a bifocal or astigmatic reflector or dish for producing a plane wave front radiation beam when illuminated by the above described horn. Other features, objects and advantages will appear from the following detailed specification taken together with the drawings, the figures of which should be considered illustrative of the invention and not limitational except insofar as required by prior art and the spirit of the claims.

Figure 2:
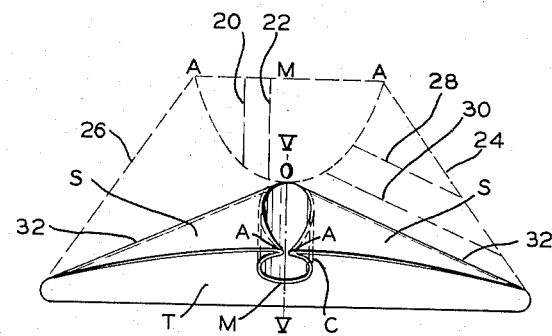
Figure 3:
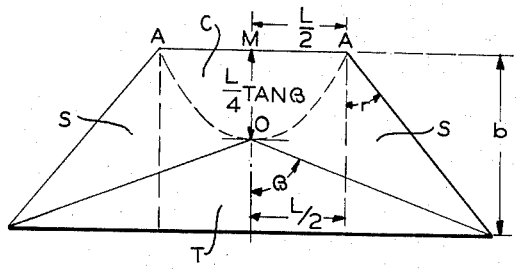
Figure 4:
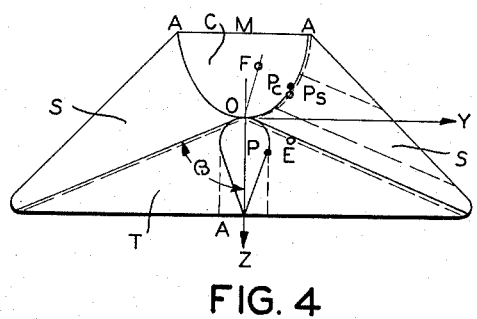
Figure 6:
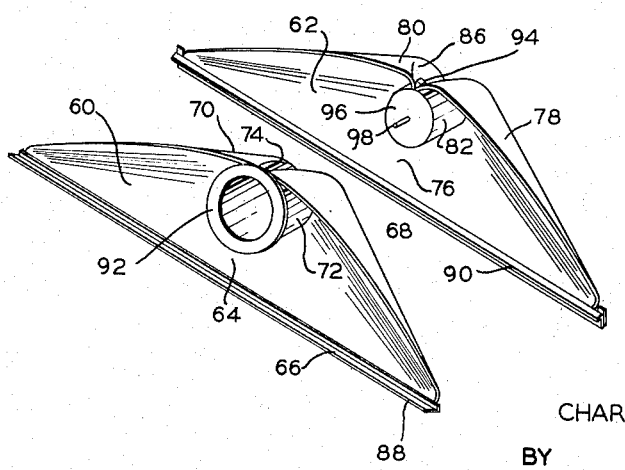
Figure 5:
Figure 10:
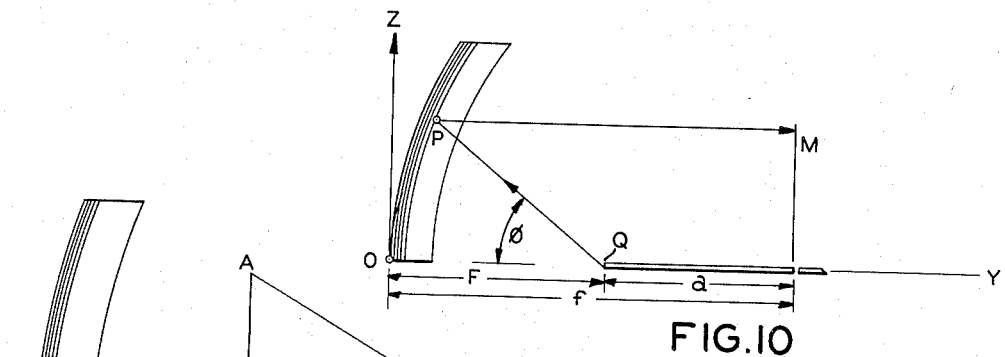
Figure 11:
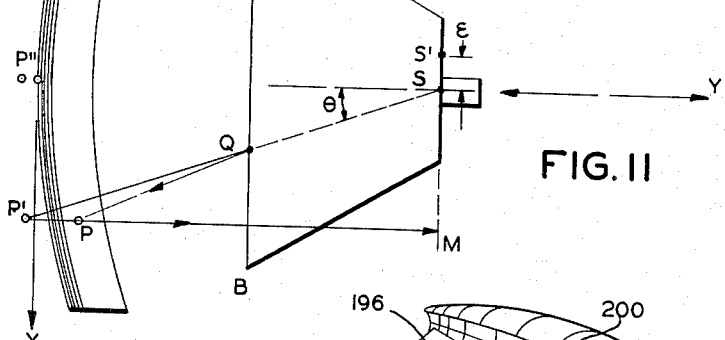
Figure 12:
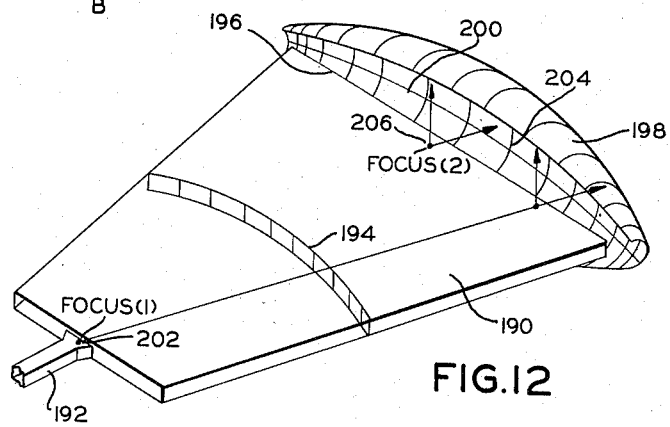
Figure 13:
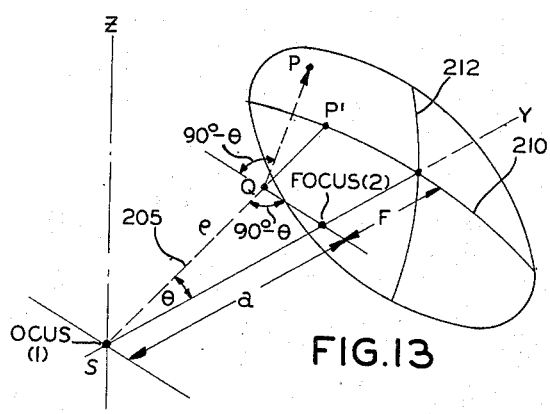

Fig. 1 is a plan diagram of a scanning feed horn and reflector with a movable feed; Figs. 3 and 4 show the lines along which trapezoidal plates may be cut and rolled to provide an annular throat opening; Fig. 2 is a composite diagram showing such a flat trapezoidal plate and the manner in which it is rolled cylindrically; Fig. 5 is a middle cross-section of the plate along line V—V after it is rolled and bent as in Fig. 2; Fig. 6 shows an exploded view of a typical embodiment of the invention of the parallel plate full reverse bend rolled throat scanning feed horn, without mounting and feed; Fig. 7 is a perspective view of a typical embodiment of the horn together with a portion of a revolvable feed for the horn; Fig. 8 is a mid-section through the cylindrical throat; Fig. 9 is a perspective view partially in section of the annular throat region of a typical horn in accordance with this invention having an extra 90° bend in the throat so that the feed may be radial to the feed axis of revolution instead of parallel to it, and showing also an absorbent wedge shaped septum provided to minimize ambiguity of response at the feed crossover point; Figs. 10 and 11 show side and top views respectively of a bifocal or astigmatic reflecting dish fed by a flat horn for the purpose of deriving the equations defining the necessary surface to rectify the arcuate wave front which emanates from such a horn; Fig. 12 shows a perspective view of the arrangement of Fig. 10 and Fig. 11, and Fig. 13 is a graphical illustration of a bifocal reflector for deriving the equations descriptive of such a reflector.

Referring now to Fig. 1 there is shown a plan diagram of a parallel plate feed horn 2 composed of two trapezoidal shaped flat plates disposed parallel one above the other, having a movable wave guide feed horn 4 for feeding energy into the small rectangular throat opening between the plates at the smaller end 6. Electrically the principles of operation of this arrangement are the same as for the same horn rolled and bent in accordance with this invention, but are more convenient for purposes of explanation.

The horn 4 constitutes in effect a point source in the throat and projects a circular wave front in the TEM or free space mode through the horn to its aperture 8 at the larger end of the trapezoids. These wave fronts may be represented by the circular arcs, such as 10 for example. When these wave fronts arrive at the aperture 8 they are no longer confined between the plates and hence spread out in the vertical plane perpendicular to the plane of the aperture. The aperture thus constitutes substantially a line source and the wave front of the radiation emanating therefrom in this case will have the shape of a surface produced by revolving a circular arc about its chord.

Disposed forward of the aperture 8 of the horn 2 is an astigmatic or bifocal reflector 11 which is so constructed (in accordance with details of this invention stated below), that it reflects a plane wave front radiation beam represented by the parallel straight lines, such as 12 and 14 for example when it is illuminated by the output emanting from the long narrow rectangular aperture 8 of the trapezoidal parallel plate horn.

When the movable feed horn 4 is at the position shown the wave fronts from the reflector are tilted as shown. When the horn 4 is at the focus or mid scan position 16 the reflected beam wave front would be directed parallel to the feed horn aperture 8 but of course travelling in the opposite direction and finally when the horn 4 has been moved to the extreme right hand position 18 as indicated by dotted lines the beam would have the opposite tilt. Such a system therefore will produce a plane wave front radiation beam which tilts or scans back and forth as the wave guide feed horn moves periodically back and forth at the throat.

The identical result will be produced if the throat end of the flat horn is rolled up cylindrically or conically so that the plates at the throat become concentric circles enclosing an annular throat opening. In the Spencer patent application referred to above this idea is described, but in that case the rolling of the throat is only partial, i. e. the flat plates are rolled into a semi-annular throat. In the present invention the flat trapezoidal plates are rolled at the throat end into complete circles so that the region of the throat will consist of two concentric cylinders while the output aperture remains straight. If this is done scanning is accomplished by simply revolving the wave guide feed around the annular throat, no R. F. switch or multi-arm rotating feed being required. The amount of tilt is about equal to the feed displacement divided by the focal length from feed to reflector.

By comparing Figures 2, 3 and 4 it will readily be seen how the flat sheet is formed into the necessary shape, by noting the positions of the several points and areas in the flat and after the rolling and bending. Attention is called to the cylindrical elements 20 and 22, which are parallel to MO both before and after the shaping process and are elements of the circular cylinder which forms one surface bounding the annular throat entrance region. The slant sides 24 and 26 are meanwhile rolled cylindrically with elements 28 and 30 to form a shoulder or side cylinder 32.

Fig. 5 shows a middle cross-section of the plate after it is bent and rolled as taken along the line V—V of Fig. 2.

Fig. 6 shows in perspective view the inner horn plate 60 and outer horn plate 62 in an exploded view. As described above the inner plate consists of a flat triangular region 64 near the aperture edge 66, which flat region may be called the "output plane" of the horn or "scanning plane" in order to provide a reference plane for the aperture and the horn throat, and also comprises cylindrically rolled shoulder or side cylinder regions 68 and 70 and finally the cylindrical throat region 72 connecting with the side cylinders 68 and 70 on a relatively sharp bend along a curved region 74 shaped like a horse collar. Similarly, the outer of the two parallel horn plates 62 has its flat output region 76, its shoulder or side cylinder regions 78 and 80, and its cylindrical throat region 82 connected with the side cylinders 78 and 80 along a sharp bend in the "horse collar" region 86.

Incidentally included in this view are the horn aperture flaps 88 and 90 attached to the respective straight aperture edges of the two plates in order to provide an outward flaring of the aperture to narrow the beam in the vertical plane (or in other words in the plane normal to the aperture). Also shown is a ring 92 attached to the circular input end of the cylindrical throat 72 of the inner plate 60 to provide a means for supporting the intended outer plate 62. Attached to a corresponding position on the throat 82 of the outer plate 62 is a block 94 which may be in assembly bolted or otherwise attached to ring 92 of the inner plate 60. Finally there is shown a disk 96 fitted in the end of cylindrical throat 82 to provide a mounting for an axle 98 on which a movable wave guide feed (not shown here) may revolve.

Fig. 7 shows the horn assembled with the inner plate 110 inserted and mounted within the outer plate 112. In this view the characteristics of the horn appear clearly. The input or throat is an annular space 114 included between the two cylindrical throat regions of the respective plates and the horn outlet or aperture is a long straight slit 116 between two flaring flaps 117 and 119 referred to above. A revolving wave guide feed horn 118 is shown pivoted at the center of the annular throat opening 114, i. e. about the common axis 120 of the throat cylinders. This feed 118 of course would be provided with quarter wave chokes on the face adjacent to the throat to prevent leakage. As this feed guide 118 revolves the output radiation from the aperture 116 will suffer variations in phase which in conjunction with the proper reflector will provide a beam which scans or tilts correspondingly.

Fig. 8 is a mid section through the horn of Fig. 7 perpendicular to the aperture, included to assist in visualizing the convolutions of the horn shape.

The feed region of the horn in a modified form is shown in Fig. 9 in perspective and partially in section. At the bottom appear the forward edges 130 and 132 of the inner horn plate 134 and outer horn plate 136 respectively, which form the narrow rectangular aperture 138. The shape of the side cylinders or shoulders 138 and 140 are clearly shown in section, and likewise the connecting regions between the respective shoulders and throats consisting of sharp bends 142 and 144. The parallel concentric inner and outer cylinders, respectively 146 and 148, of the feed region also appear in section.

In this embodiment the throat has an added 90° bend at its inlet 150 to permit energy to be fed radially into the throat space between throat cylinders 146 and 148. A primary horn could otherwise be pointed in the axial direction rather than radially but leads to a clumsier and less practical design. The 90° toroidal bend also has some focusing effect on the primary radiation and permits the use of a slightly smaller aperture at the opening of the revolving wave guide 154 which feeds it.

It may be helpful to follow the course followed by energy from the magnetron in passing through the horn after travelling through a guide to a coaxial conventional rotating joint (not shown). The energy then comes along the revolvable coaxial conductor consisting of outer conductor 156 and inner conductor 158 which then energizes the wave guide feed horn 154. Energy then passes along the guide 154 and into the toroidal bend or inlet 150, thence into the cylindrical region between rolled throat plates 146 and 148 then to the rear of the horn to the reverse bend shoulder and then forward again and out the aperture 138.

The end of the coaxial feed line appears in the interior along the axis of the concentric cylindrical throat. Other features of the feed region worthy of comment are the bearing plate 160 which fills in the end area of the smaller throat cylinder 146, and which by its annular projection 162 together with the end portion of hte smaller throat cylinder 146 also provides a quarter wave choke cavity 164. Likewise, comprising an extension on the larger cylinder 148 is annular member 166, which is shaped to provide the toroidal inlet bend to the horn, and which also is grooved as shown to provide a quarter wave choke cavity 168 outside the wave guide feed 154.

The support for the inner cylinder 146 in the feed region is provided by making the outer plate or "blunt surface" 144 additionally strong in the region indicated by points A of Fig. 2, and bolting the larger ring 166 securely to it. The smaller ring 146 may be then supported by a member (not shown) connecting it to the larger ring 166.

As the feed horn 154 rotates it produces the effect of a moving energy source between the cylinders 146 and 148 which rotates through the same angle as the horn. When the horn is in the cross over position, a double source is produced which, in the developed trapezoidal plates, corresponds to a source on each end of the base $l$ of the trapezoid. Actually there is a region of positions in the neighborhood of crossover for which there are two sources of sufficient strength to cause signal ambiguity. This is partly due to the fact that the primary horn itself covers a significant angle, and also there is an opening at cross over through which some of the radiation can leak from one side to the other. To cut down the angular region in which there is a double source, an absorbing wedge shaped septum 170, made of polyiron, is placed across this opening (Fig. 9). The horn looks right at the edge of this septum at cross over so its edge must be tapered to give a good match in this region of feed positions. To hold the polyiron in place a metal band may be cemented to the elliptical edge of it, with holes tapped in it to receive screws which are driven through the blunt surface 144. The band must not show inside the blunt surface especially near the sharp edge of the septum. The value of the septum is measured by the fact that the cross over lobe is reduced 10 db by its presence at the feed cross over point cross over, i. e. the point at which the feed energy ceases to go in the direction of extreme tilt on one side and jumps to the extreme tilt on the other side of mid-scan position.

After leaving the 90° toroidal bend, the waves proceed between the concentric cylinders to the "horse collar" region which joins the central cylinders 146 and 148 to the side cylinders (68, 70, 78 and 80 of Fig. 6). This region is the crux of the roll from the points of view of construction, optics and impedance. Right design of this part is important for matching, not only because its large distance from the feed which makes broadbanding difficult unless it is matched, but because the distance from the feed to various parts of the "horse collar" is a function of feed position and hence of time when scanning so that rapid changes in impedance may occur which will cause detuning. In particular, the "horse collar" gives rise to a standing wave whose amplitude is greatest as the rotating feed passes the mid scan position. This comes about because, for this feed position, the effective source is at substantially the same electrical distance from most parts of the "horse collar" and thus reflections from various parts are about in phase. For other positions the effect is to focus the radiation elsewhere.

The method of design of this "horse collar" is based on two main considerations (1) optical. Low phase distortion requires a sharp "horse collar" bend. (2) Impedance. Radiation incident on the "horse collar" must match through to avoid the impedance effects mentioned above. These considerations led to a series of experiments on sharp E-bends in wave guide. The thought was that if normal sections of the "horse collar" region were made similar to well matched E-bends, with dimensions scaled in proportions to the guide wave length that then the "horse collar" region would match. Experience with rolls designed on this basis seems to justify this procedure.

The final major portion of this antenna is the principal reflector or dish, the characteristics of which are illustrated in Figs. 10 and 11 and 12 and 13. The dish has such a surface that it will reflect the horn radiation into a true plane wave when the beam is on axis, in the middle of the scan. To better understand what shape the dish must have, we should know that the radiation from the horn is equivalent to that from a pair of parallel plates fed the TEM mode by a wave guide at one side and flared at the other (Fig. 11). Using the coordinates and dimensions of Fig. 11, we can say of this radiation that wave fronts have circular sections in the YZ plane centered at the flare. It follows that the reflector section in this plane is a parabola focused at the flare. In the XY plane the sections of the wave front are also circles but are centered at the wave guide feed, so that this point is the focus of the reflector section in this (the XY) plane.

The wave fronts of the radiation from the aperture of the plates are surfaces swept out by arcs which are rotated about the aperture line. The section of the wave front with the XY-plane, i. e. the plane of the plates, is an arc centered at the wave guide source, S. The midsection perpendicular to the aperture line is an arc centered on the aperture line. It can be seen from this, that a surface which is to reflect this wave front into a plane wave traveling along the Y-axis must have as sections in these two planes, parabolas whose foci coincide with the centers of the wave front sections and whose axes are the Y-axis. To derive the equation for the reflector refer to Figs. 10 and 11 and suppose that the wave guide aperture, S, is at $(O, f, O)$ and the plate aperture at $z=O, Y=F$. Call the altitude, $F-f$, of the trapezoid "$a$." Now suppose that the dish passes through the origin and sends the radiation in the Y-direction. Let a ray start from S at an angle $\theta$ with the Y-axis. The ray will strike the aperture line at some point Q. Here it will proceed in some direction which makes an angle $90°-\theta$ with the aperture line, so that a ray in the plates spreads into a cone of rays when it reaches the aperture line. One of these rays goes to P: $(x, y, z)$ of the surface where it is reflected into a ray along the Y-axis which goes to M in the particular plane wave front $y=f$, perpendicular to the Y-axis and passing through S. The total path length $SQ+QP+PM$ must be the same as for the ray which reflects at the vertex $(O, O, O)$ of the dish and passes S again. This path is $2f$. Thus the equation of the surface is $SQ+QP+PM=2f$. To find the length $SQ+QP$ we use the fact that these segments make the same angle with the aperture line. Thus if QP is hinged around this line into QP' in the XY-plane, it will be a continuation of SQ (Fig. 11). If a perpendicular is dropped from P' to P'' we have a right triangle P'P''S whose leg P'P'' is simply $x$, and whose leg $$SP'' \text{ is } a+\sqrt{(F-y)^2+z^2}$$

thus $$SQ+QP = SP' = \sqrt{[a+\sqrt{(F-y)^2+z^2}]^2+x^2}$$

and since $PM=f-y$ the equation of the dish, $$SQ+QP+PM=2f,$$

becomes $$\sqrt{[a+\sqrt{(F-y)^2+z^2}]^2+x^2}+f-y=2f$$

This equation when solved for y is:

$$y = a/2 + (x^2+z^2)(f+F)/8fF + (1/8fF)\sqrt{[4afF-(f+F)(x^2+z^2)]^2 - 4fF[(2af-(x^2+z^2))^2 - 4a^2(F^2+z^2)]})$$

As may be seen by substitution, the sections $x=0$ and $z=0$ are the parabolas $y=z^2/4f$ and $y=z^2/4f$ as mentioned in the text.

Referring now to Figures 10, 11 and 13 for definition of terms, the dish equation may be defined by the equation:

$$\rho = \frac{(1+\cos\phi)\left(a + \frac{a+2F}{1+\cos\phi}\right)}{1+\cos\phi\cos\theta}$$

where $\rho$ is the length of the bent path from the mid scan feed point (marked S in Fig. 11) to a point Q on the horn aperture AB and then to point P on the reflector where the line QP makes the same angle with the aperture line AB that the line SQ makes with line AB, namely $90°-\theta$; and where $\theta$ and $\phi$ are the angles so marked in the figures. It should be noted that the line QP in Fig. 10 except in one special case where Q is on the mid scan line would not fall in the plane of symmetry, that is the plane of the paper in Fig. 10. QP in all other cases would not be in the plane of the paper, but would leave it obliquely from Q. Otherwise described, the line QP has the direction of an extension SP' of SQ which has been revolved about the aperture line AB as an axis. In such case the angle $\phi$ would equal angular amount of such revolving about the axis, measured of course in a plane perpendicular to the axis.

$\rho$ is indicated in Fig. 13 by a dotted line. The equal angles $90°-\theta$ which SQ and QP make with the aperture are also shown. The cross section of the reflector in a plane $\varphi = a$ constant is an ellipse of eccentricity $\cos\varphi$. The sections of the reflector for $\varphi=0$ and $\theta=0$ are each parabolas 210 and 212 respectively in Fig. 13.

The Figure 12 shows a trapezoidal parallel plate horn 190 fed by a movable wave guide feed 192 and indicates the circular shape of the advancing wave front 194 within the horn. Emerging from the aperture 196 of the horn 190 the wave front will expand in the vertical plane as described above. Hence to transform the incident wave into a reflected wave having a plane front the dish 198 must have one parabolic section 200 in the aperture plane with its focus 202 at the feed input, and must also have parabolic section 204 in the vertical plane, normal to the plane of the aperture 196 at the vertex of the first parabola but in this case with focus 206 at the aperture 196 instead of at the feed 192, its surface is constructed as described above. The reflected wave will now have a plane front as indicated also in Fig. 1.

While particular embodiments have been shown and described it is to be understood that the principles of the invention are not limited to these, but only by the prior art and the spirit of the appended claims.

What is claimed is:

1. A reflector scanning feed horn for a directional microwave antenna comprising two trapezoidal parallel plates rolled, bent and disposed relatively to each other so that the longer pair of parallel edges thereof form a long narrow rectangular aperture, and the shorter pair of parallel edges form an annular throat opening in a plane substantially parallel to the rectangular aperture and substantially perpendicular to the scanning plane, said plates having a full reversing bend between said respective pairs of edges so that said annular opening faces substantially in the same direction as the rectangular opening, and a wave guide feed for said annular opening, said feed revolving about the center of said annular throat opening whereby a wave front of correspondingly variable phases is projected from the rectangular aperture.

2. In an antenna, in combination, a full reverse bend rolled throat horn and revolvable feed therefor substantially as described in claim 1, and a microwave absorbent septum placed in said annular throat opening at the scan crossover point of the feed for reducing ambiguity of response.

3. The antenna of claim 1 wherein said horn has added an absorbent septum at the feed cross-over point, and comprising also a bifocal reflector having a parabolic central cross section in the horizontal plane with a focus at the mid point of said annular throat opening and another parabolic cross section of different focal length in the plane perpendicular to said first parabola at its vertex having a focus at said rectangular opening, other horizontal sections of said reflector being ellipses.

4. A bifocal microwave scan antenna reflector whose section in one plane is a parabola, of one focal length and whose section in the plane perpendicular to said parabola at its vertex is another parabola having a different focal length, and whose sections by planes parallel to said first named plane are ellipses.

5. An astigmatic microwave rapid scan antenna reflector for transforming a wave front shaped like the surface formed by revolving a circular arc about its intercepted chord, into a plane wave front radiation beam, said reflector being parabolic in one plane and also parabolic with a different focal length in the plane perpendicular to said first parabola at its vertex, and elliptical in planes parallel to said first named plane.

6. A microwave antenna for radiating a shaped beam for scanning in elevation comprising source of microwave energy, a tapered parallel plate trapezoidal shaped horn feed having an edge of each plate rolled into a circular arc to form a cylindrical throat input aperture and an opposite edge forming a narrow rectangular linear output aperture, a movable wave guide section for feeding energy from said source into the throat of said horn, a double curvature reflecting surface illuminated by the energy emerging from the output aperture of said horn and possessing such configuration that its cross sections in the plane perpendicular to said linear output aperture are parabolas with foci along the line of said output aperture and its cross section in the plane of said linear output aperture is a parabola with a focus at the mid point of said circular throat input aperture and means to rotate said wave guide section about the center of said circular throat aperture to effect scanning of said beam.

7. A microwave antenna for radiating a shaped beam for scanning in elevation comprising a source of microwave energy, a tapered parallel plate trapezoidal shaped horn feed having an edge of each plate rolled into a circular arc to form a cylindrical throat input aperture and an opposite edge forming a narrow rectangular linear output aperture, a movable wave guide section for feeding energy from said source into the throat of said horn, a double curvature reflecting surface illuminated by the energy emerging from the output aperture of said horn and possessing such configuration that its cross sections in the plane perpendicular to said linear output aperture are parabolas with foci along the line of said output aperture and its cross section in the plane of said linear output aperture is a parabola with a focus at the mid point of said circular throat input aperture, means to rotate said wave guide section about the center of said circular throat aperture to effect scanning of said beam, and a microwave absorbent septum placed at the cross over point of said rolled throat input aperture.

8. A microwave antenna for radiating a shaped beam for scanning in elevation comprising, a source of microwave energy, a tapered feed horn having two parallel plates of trapezoidal shaped rolled, bent, and disposed relative to each other so that one pair of corresponding edges thereof form a long narrow rectangular aperture and the opposite pair of corresponding edges thereof form an annular throat aperture, a movable wave guide section for feeding energy from said source into the throat of said horn, a double curvature reflecting surface illuminated by the energy emerging from the output aperture of said horn and possessing such configuration that its cross sections in the plane perpendicular to said linear output aperture are parabolas with foci along the line of said output aperture and its cross section in the plane of said linear output aperture is a parabola with a focus at the mid point of said circular throat input aperture, means to offset said wave guide source from said second named focus by rotation about said circular throat aperture to effect scanning of said beam, and a microwave absorbent septum placed at the cross over point of said rolled throat input aperture.

9. The antenna feed of claim 1 wherein said annular throat opening is formed into an additional 90° bend at its input to provide for a rotational radial energy feed from said wave guide source.

10. The antenna feed of claim 1 wherein said annular throat opening is formed into an additional 90° bend at its input to provide for a rotational radial energy feed from said wave guide source and wherein said annular throat is closed by a metallic plate having on the surface thereof a quarter wave choke cavity to prevent unwanted reflections from said annular throat opening and a microwave absorbent septum placed in said annular throat opening at the scan cross over point for reducing ambiguity of response.

11. A bifocal microwave scanning antenna comprising, a reflector whose section in one plane is a parabola of one focal length and whose section in the plane perpendicular to said parabola at its vertex is another parabola having a different focal length and whose sections by planes parallel to said first main plane are ellipses and a trapezoidal parallel plate horn disposed to illuminate said reflector with a linear source of microwave energy spaced from said reflector at a distance of the shorter focal length.

12. A bifocal microwave scanning antenna comprising, a reflector whose section in one plane is a parabola of one focal length and whose section in the plane perpendicular to said parabola at its vertex is another parabola having a different focal length and whose sections by planes parallel to said first main plane are ellipses, a source of microwave energy located from said reflector at the longer of said focal lengths and a trapezoidal parallel plate horn disposed between the longer and the shorter of said focal lengths to transform the energy from said source to a linear source of energy located at the shorter of said focal lengths.

13. A bifocal microwave scanning antenna comprising, a reflector whose section in one plane is a parabola of one focal length and whose section in the plane perpendicular to said parabola at its vertex is another parabola having a different focal length and whose sections by planes parallel to said first main plane are ellipses, a source of microwave energy located from said reflector at the longer of said focal lengths, a trapezoidal parallel plate horn disposed between the longer and the shorter of said focal lengths to transform the energy from said source to a linear source of energy located at the shorter of said focal lengths and a movable wave guide section to feed said horn from said microwave source at points offset from said longer focal length to effect scanning.

14. A microwave rapid scan antenna comprising, a reflector for transforming a wave front shaped like the surface formed by revolving a circular arc about its intercepting chord into a plane wave front radiation beam, said reflector being parabolic in one plane and also parabolic with a different focal length in the plane perpendicular to said first parabola at its vertex and elliptical in planes parallel to said first-named plane and a parallel plate feed horn having two trapezoidal-shaped plates disposed equidistant from each other to illuminate said reflector with a linear source of microwave energy and spaced from said reflector at a distance of the shorter focal length.

15. A microwave rapid scan antenna comprising, a reflector for transforming a wave front shaped like the surface formed by revolving a circular arc about its intercepting chord into a plane wave front radiation beam, said reflector being parabolic in one plane and also parabolic with a different focal length in the plane perpendicular to said first parabola at its vertex and elliptical in planes parallel to said first-named plane, a source of microwave energy located at the focus of said longer focal length parabola, a trapezoidal parallel plate feed horn coupled to said source and dispossed between the longer and the shorter of said focal lengths to transform the energy from said source to a linear source of energy located at the focus of the shorter focal length parabola, and a wave guide section for feeding energy from said source into said feed horn and movable to offset said microwave source from said longer focal length to effect scanning.

16. A microwave antenna for radiating a shaped beam for scanning an elevation comprising, a source of microwave energy, a parallel plate feed horn having two trapezoidal plates disposed equidistant from each other, said horn being rolled, bent and disposed so that the longer pair of parallel edges thereof form a long, narrow, rectangular mouth opening and the shorter pair of parallel edges thereof form an annular throat opening in a plane substantially parallel to said mouth opening, said plates being given a full reversing bend between said edges so that said throat and mouth openings face in the same direction, a movable wave guide section for feeding energy from said source into said throat opening to propagate a substantially circular wave front in said horn, and a reflector illuminated by the energy emerging from the mouth of said horn, said reflector having a bifocal parabolic contour adapted to transform the wave front emerging from said trapezoidal horn into a plane wave front radiation beam.

17. A microwave antenna for radiating a shaped beam for scanning an elevation comprising a source of microwave energy, a parallel plate feed horn having two trapezoidal plates disposed equidistant from each other, said horn being rolled, bent and disposed so that the longer pair of parallel edges thereof form a long, narrow, rectangular mouth opening and the shorter pair of parallel edges thereof form an annular throat opening in a plane substantially parallel to said mouth opening, said plates being given a full reversing bend between said edges so that said throat and mouth openings face in the same direction, a movable wave guide section for feeding energy from said source into said throat opening of said horn to propagate a substantially circular wave front therein, a reflector illuminated by the energy emerging from the mouth of said horn, said reflector having a biofocal parabolic contour adapted to transform the wave front emerging from said trapezoidal horn into a plane wave front radiation beam, and means to rotate said wave guide section about the center of said annular throat opening to effect scanning of the radiated beam.

18. A microwave antenna for radiating a shaped beam for scanning an elevation comprising a source of microwave energy, a parallel plate feed horn having two trapezidal plates disposed equidistant from each other, said horn being rolled, bent and disposed so that the longer pair of parallel edges thereof form a long, narrow, rectangular mouth opening and the shorter pair of parallel edges thereof form an annular throat opening in a plane substantially parallel to said mouth opening, said plates being given a full reversing bend between said edges so that said throat and mouth openings face in the same direction, a movable wave guide section for feeding energy from said source into said throat opening of said horn to propagate a substantially circular wave front therein, a bifocal parabolic reflector illuminated by the energy emerging from the mouth of said horn, said reflector having a first focus at the midpoint of said annular throat opening and a second focus at said rectangular opening to transform the wave front emerging from said trapezoidal horn into a plane wave front radiation beam, and means to rotate said wave guide section about the center of said annular throat opening to effect scanning of the radiated beam.

19. A microwave antenna for radiating a shaped beam for scanning an elevation comprising a source of microwave energy, a parallel plate feed horn having two trapezoidal plates disposed equidistant from each other, said horn being rolled, bent and disposed so that the longer pair of parallel edges thereof form a long, narrow, rectangular mouth opening and the shorter pair of parallel edges thereof form an annular throat opening in a plane substantially parallel to said mouth opening, said plates being given a full reversing bend between said edges so that said throat and mouth openings face in the same direction, a movable wave guide section for feeding energy from said source into said throat opening of said horn to propagate a substantially circular wave front therein, a bifocal reflector illuminated by the energy emerging from said mouth opening, said reflector having a first focus at the midpoint of said throat opening and a second focus at said mouth opening and a parabolic contour adapted to transform the wave front emerging from said trapezoidal horn into a plane wave front radiation beam, means to rotate said wave guide section about the center of said annular throat opening to effect scanning of the radiated beam, and a microwave absorbent septum spaced in said annular throat opening at the scan crossover point of the feed thereto.

References Cited in the file of this patent

UNITED STATES PATENTS

| | | |
|---|---|---|
| 2,039,648 | Ives | May 5, 1936 |
| 2,146,905 | McLeod | Feb. 14, 1939 |
| 2,181,181 | Gerhard | Nov. 28, 1939 |
| 2,206,683 | Wolff | July 2, 1940 |
| 2,325,765 | Gartenmeister | Aug. 3, 1943 |
| 2,416,675 | Beck et al. | Mar. 4, 1947 |
| 2,504,333 | Iams | Apr. 18, 1950 |
| 2,524,292 | Iams | Oct. 3, 1950 |

OTHER REFERENCES

"Practical Analysis of Ultra High Frequency," by Meagher and Markley; RCA Service Company publication, August 1943, page 7.